US009386045B2

(12) United States Patent
Kgil et al.

(10) Patent No.: US 9,386,045 B2
(45) Date of Patent: Jul. 5, 2016

(54) DEVICE COMMUNICATION BASED ON DEVICE TRUSTWORTHINESS

(71) Applicant: Visa International Service Association, San Francisco, CA (US)

(72) Inventors: Taeho Kgil, Foster City, CA (US); Selim Aissi, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/134,959

(22) Filed: Dec. 19, 2013

(65) Prior Publication Data

US 2014/0173686 A1 Jun. 19, 2014

Related U.S. Application Data

(60) Provisional application No. 61/739,370, filed on Dec. 19, 2012.

(51) Int. Cl.
H04L 29/06 (2006.01)
(52) U.S. Cl.
CPC .................................. *H04L 63/205* (2013.01)
(58) Field of Classification Search
CPC .................................................... H04L 63/205
USPC ............................................................. 726/1
See application file for complete search history.

(56) References Cited

U.S. PATENT DOCUMENTS

| 7,149,895 | B1 | 12/2006 | Asokan et al. |
| 7,610,328 | B2 * | 10/2009 | Haase ..................... H04W 8/18 455/445 |
| 7,797,544 | B2 | 9/2010 | Dillaway et al. |
| RE42,382 | E * | 5/2011 | Weiss ...................... G06F 21/80 713/165 |
| 8,037,511 | B1 * | 10/2011 | Lundy ..................... E05B 47/00 340/686.6 |
| 8,090,767 | B2 | 1/2012 | Adler et al. |
| 8,286,239 | B1 * | 10/2012 | Sutton ............................. 726/22 |
| 8,327,131 | B1 * | 12/2012 | Hardjono et al. ............. 713/156 |
| 2005/0266798 | A1 | 12/2005 | Moloney et al. |
| 2006/0212931 | A1 * | 9/2006 | Shull et al. ...................... 726/10 |
| 2008/0189788 | A1 * | 8/2008 | Bahl ................................ 726/25 |
| 2009/0204964 | A1 | 8/2009 | Foley et al. |
| 2009/0319793 | A1 | 12/2009 | Zic et al. |
| 2010/0130172 | A1 * | 5/2010 | Vendrow et al. .............. 455/411 |

(Continued)

OTHER PUBLICATIONS

Ibraimi, Luan, Muhammad Asim, and Milan Petković. "Secure management of personal health records by applying attribute-based encryption." Wearable Micro and Nano Technologies for Personalized Health (pHealth), 2009 6th International Workshop on. IEEE, 2009.*

*Primary Examiner* — Shawnchoy Rahman
(74) *Attorney, Agent, or Firm* — Kilpatrick Townsend & Stockton LLP

(57) ABSTRACT

Techniques for assessing the trustworthiness of a target device that a user device is attempting to communicate with are described. A user device may request one or more trustworthiness attributes of a target device before exchanging data with the target device. The user device may receive the one or more trustworthiness attributes of the target device, and determine, based on the received one or more trustworthiness attributes of the target device, a set of one or more security policies to enforce on a communication channel used for exchanging data between the user device and the target device. A communication channel between the user device and the target device can then be established according to the set of one or more security policies.

18 Claims, 8 Drawing Sheets

(56) References Cited

U.S. PATENT DOCUMENTS

| | | | |
|---|---|---|---|
| 2012/0233665 A1* | 9/2012 | Ranganathan et al. | 726/4 |
| 2012/0260345 A1 | 10/2012 | Quinn et al. | |
| 2014/0047019 A1* | 2/2014 | Midtun | H04L 51/043 709/204 |
| 2014/0325670 A1* | 10/2014 | Singh et al. | 726/26 |

* cited by examiner

DEVICE COMMUNICATION BASED ON DEVICE TRUSTWORTHINESS

CROSS-REFERENCES TO RELATED APPLICATIONS

This application is a non-provisional application and claims the benefit of priority of U.S. Provisional Application No. 61/739,370 titled "RANKING TRUSTWORTHINESS OF I/O CONNECTIVITY" filed on Dec. 19, 2012, which is herein incorporated by reference in its entirety for all purposes.

BACKGROUND

As the computing capabilities of mobile devices become more and more powerful, users are increasingly utilizing their mobile devices to perform more and more tasks. To facilitate the numerous tasks that are performed with a mobile device, the amount of data and information stored on or otherwise accessible by a mobile device have increased. This may include sensitive information such as Personal Account Information (PAI) and Personal Identifying Information (PII) associated with the user. The number and types of devices that a mobile device connects and communicates with have also increased. For example, a mobile device may communicate with a personal computer to synchronize the two devices; a mobile device may communicate with an automotive infotainment system to conduct phone calls via an automobile's audio system; a mobile device may communicate with another mobile device to exchange photos or other information; a mobile device may communicate payment information to a point-of-sale (POS) to make a purchase; a mobile device may communicate with a wireless access point device to access the internet or other services; etc.

While the increase in the number and types of devices that a mobile device can connect with has improved the usability of a mobile device, the various types of devices that a mobile device can connect with also leads to greater security risks and threats faced by a mobile device. For example, a user may connect the user's mobile device to another device without knowing that the device has been infected with malware. As a result, sensitive information and data such as PAI and PII from a user's mobile device may be accessed by the infected device without user's knowledge. Although such risks and threats are more prevalent for a mobile device due to the portability nature of a mobile device, any user device that can communicate with other devices can face similar risks and threats.

Embodiments of the present disclosure address these and other problems, individually and collectively.

BRIEF SUMMARY

Embodiments of the present invention provide techniques for assessing the trustworthiness of a target device before exchanging user data with the target device. According to some embodiments, user device may request one or more trustworthiness attributes of a target device before exchanging user data with the target device. The user device may receive the one or more trustworthiness attributes of the target device, and determine, based on the received one or more trustworthiness attributes of the target device, a set of one or more security policies to enforce on a communication channel used for exchanging user data between the user device and the target device. A communication channel between the user device and the target device can then be established for exchanging user data according to the set of one or more security policies.

According to some embodiments, a target device may receive a request from a user device for one or more trustworthiness attributes of the target device before exchanging user data with a user device. The target device may determine the requested one or more trustworthiness attributes of the target device, and send the determined one or more trustworthiness attributes of the target device to the user device. The target device may receive one or more security policies to enforce on a communication channel used for exchanging user data between the user device and the target device, and establish a communication channel between the user device and the target device for exchanging user data according to the one or more security policies.

According to some embodiments, a user device may include communication circuitry for implementing a communication channel used for exchanging user data with a target device, one or more processors, and one or more memories coupled to the one or more processors. The one or more memories can include executable code which when executed by the one or more processors causes the user device to request one or more trustworthiness attributes of a target device before establishing the communication channel with the target device, receive the one or more trustworthiness attributes of the target device, and determine, based on the received one or more trustworthiness attributes of the target device, a set of one or more security policies to enforce on the communication channel when exchanging user data with the target device. The executable code can also cause the user device to establish the communication channel using the communication circuitry after determining the set of one or more security policies, and enforce the set of one or more security policies on the communication channel when exchanging user data with the target device

DETAILED DESCRIPTION

Figure 1:
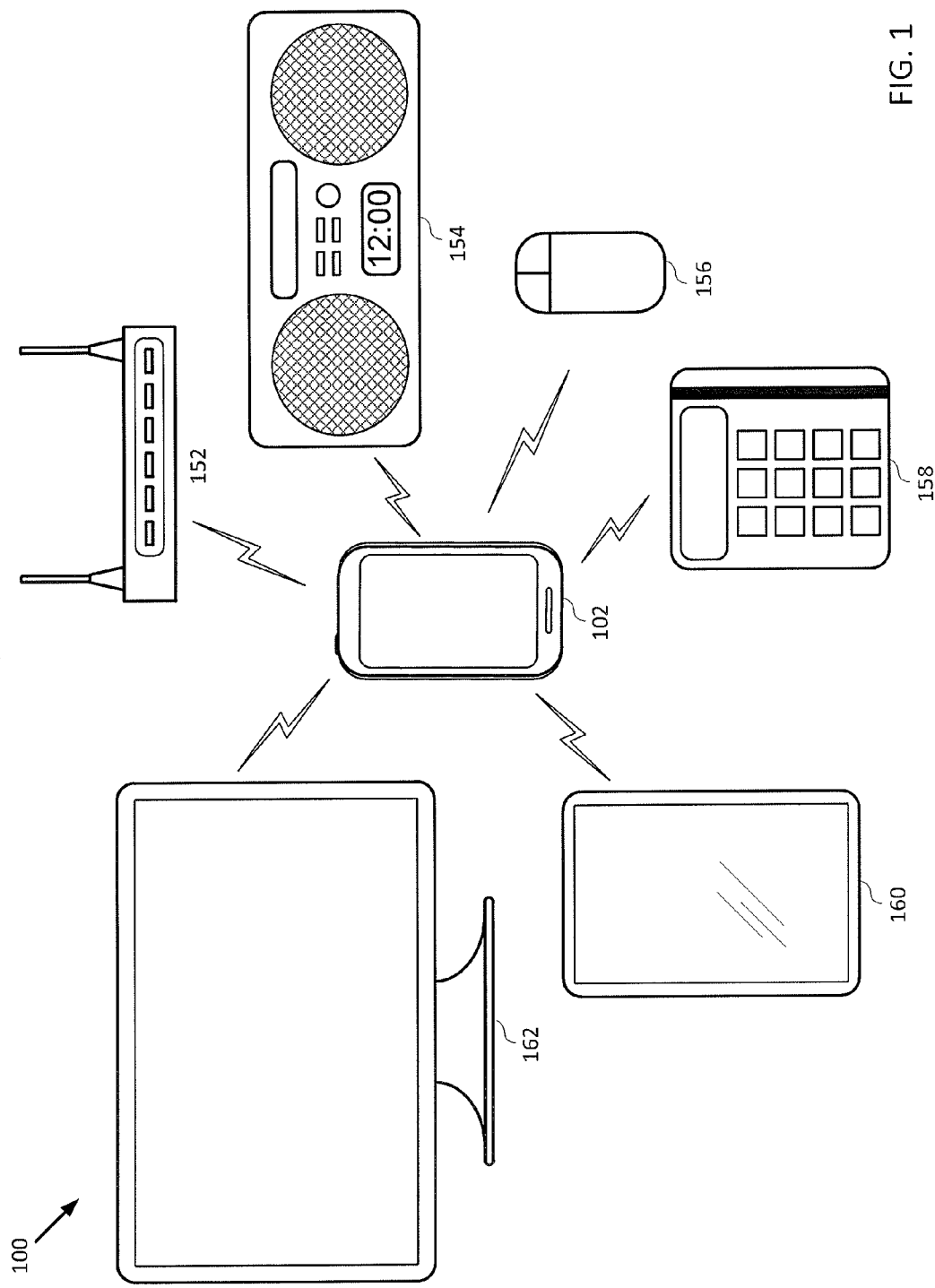
FIG. 1 illustrates an exemplary system in accordance with some embodiments.

Embodiments of the present invention provide techniques for assessing the trustworthiness of a target device that a user device is attempting to communicate with before allowing data to be exchanged between the user device and the target device. One way of protecting a user device from connecting to and communicating with an untrusted device is to employ an authentication process between the user device and the target device. The authentication process may involve one or both of the devices providing credentials to verify the identity of the respective devices. Such authentication process may include providing a password or passcode, or exchanging cryptographic messages such as a cryptographic challenge and response to verify the identity of one or both of the devices before data can be exchanged between the devices. While such authentication techniques can assist with verifying the identity of a target device, such authentication techniques do not guarantee the trustworthiness of the target device because any target device with the necessary credentials, even if the target device has been infected with malware or a virus, can complete and pass the authentication process. Moreover, some device connectivity techniques such as some implementation of Universal Serial Bus (USB) and Universal Asynchronous Receiver Transmitter (UART) protocols do not even require an authentication process before the devices start communicating and exchanging data with each other.

According to some embodiments, instead of or in addition to relying on an authentication process, a user device can request one or more trustworthiness attributes of a target device to assess the trustworthiness of the target device before exchanging data with the target device. Examples of trustworthiness attributes may include the device ownership of the target device, an integrity measurement of the target device, or a trustworthiness reputation of the target device. Upon receiving the one or more trustworthiness attributes from the target device, the user device can determined a set of one or more security polices to enforce on a communication channel used for exchanging data between the user device and the target device. In some embodiments, this determination may involve deriving a trustworthiness score of the target device based on the received trustworthiness attributes and comparing the trustworthiness score against a set of trustworthiness thresholds to determine a trustworthiness level of the target device. The set of one or more security policies to enforce on the communication channel can be based on the trustworthiness level of the target device. Other factors that can be considered for assessing the trustworthiness of a target device and/or for determining the set of security rules to enforce can include the location of the user device or the target device, user behavior in relation to the target device, the role of the target device in the relationship between the user device and the target device, or other factors that provide some indication of whether the target device can be trusted. In some embodiments, the one or more security policies or a subset of the security policies can be provided to the target device to facilitate compliance of the target device to the security rules. A communication channel used for exchange data between the two device can then be established between the user device and the target device according to the set of one or more security policies, and the user device can begin exchanging data with the target device after assessing the trustworthiness of the target device.

Prior to discussing the various embodiments of the present invention, a description of some terms may be helpful for a better understanding of the disclosure.

A "user device" is an electronic device that is operated by a user. A user device can include electronic components such as one or more processors (e.g., single core or multicore) coupled to one or more computer readable and/or writable memories (e.g., implementing one or more storage devices and/or system memories). A user device can be used to execute one or more software applications. Examples of user devices may include computers (e.g., desktops, laptops, netbooks, ultrabooks, etc.), mobile devices (e.g., mobile phones, tablet devices, personal digital assistants, portable media players, wearable computing devices, electronic reader devices, etc.), security token devices (e.g., payment cards, access cards, etc.), or other electronic devices that a user operates. Some user devices can be used for conducting financial transactions.

A "mobile device" is a portable electronic device that may be transported and operated by a user. A mobile device may provide remote communication capabilities to a network. The mobile device may be configured to transmit and receive data or communications to and from other devices. Examples of mobile devices may include mobile phones (e.g., smart phones, cellular phones, etc.), PDAs, portable media players, wearable computing devices, electronic reader devices, etc. Examples of mobile devices may also include portable computing devices (e.g., laptops, netbooks, ultrabooks, etc.).

A "target device" is an electronic device that can communicate with a user device. A target device can include electronic components such as communication circuitry that is used to communicate with a user device. Some target devices may include one or more processors (e.g., single core or multicore) or microcontrollers coupled to one or more computer readable and/or writable memories (e.g., implementing one or more storage devices and/or system memories). Examples of target devices may include any of the examples of user devices described above, network access point devices (e.g., wireless access point devices, router devices, gateway devices, base stations, etc.), peripherals or input/output (I/O) devices (e.g., keyboards, pointer devices, display devices, speakers, headphones, cameras, microphones, printers, storage devices, docking stations, etc.), cloud storage devices, entertainment systems (e.g., clock radios, stereo systems, etc.), infotainment systems (e.g., in-vehicle or in-flight infotainment systems), gaming systems, point-of-sale devices, access terminals, server computers, etc. In some instances, a user device can also switch role and be used as a target device.

A "master" is a device that controls another device in a master-slave device relationship. A "slave" is a device that accepts control from a master device in a master-slave device relationship. In some instances, a single device may act as both a master and a slave to another device at different times.

A "server" or "server computer" may typically be a powerful computer or cluster of computers. For example, the server computer can be a large mainframe, a minicomputer cluster, or a group of servers functioning as a unit. In one example, the server computer may be a database server coupled to a web server.

The term "exchange" and its variants refer to the transfer of information or data between two devices. The transfer can be unidirectional (i.e. from a one device to another device), or be bi-directional (i.e. from one device to another device, and vice versa).

A "communication channel" refers to a communication path between two devices. The communication channel can be used to exchange data between the two devices. A communication channel can be established on a connection medium, which can be wired (e.g., a cable) or wireless (e.g., electromagnetic waves). For example, a communication channel can be established on a wired connection implementing USB, UART, Ethernet, manufacturer specific protocols such as Lightning, High-Definition Multimedia Interface (HDMI), DisplayPort, or other digital or analog audio/video protocols, or other suitable wired connection protocols; or a communication channel can be established on a wireless connection implementing Bluetooth, Near Field Communication (NFC), WiFi, WiMax, wireless USB, CDMA, GSM, 3GPP, 3GPP2, LTE, or other suitable wireless connection protocols. Some connectivity protocols such as Digital Living Network Alliance (DLNA) can be implemented using a combination of wired and wireless communication channel. A communication channel may, in some instances, be a secure communication channel implemented on a connection medium. Examples of secure communication channels may include Transport Layer Security (TLS) sessions, Secure Sockets Layer (SSL) sessions, or other communication channels that involve the use of encryption.

A "security policy" may include a set of one or more rules used for protecting and/or controlling access to a device. For example, a security policy may determine what type of data or information can be accessed (e.g., based on sensitivity, storage location, etc.), or how the data or information can be accessed (e.g., authentication, encryption, digital signature, etc.). A security policy can be enforced on a communication channel such that data exchanged on the communication channel adheres to the rules of the security policy.

The term "integrity" may refer to an indication of the absence of corruption in a software or hardware component of device. Integrity can be used to indicate that a component can be trusted, is unaltered, and has not been modified by an unauthorized party, or otherwise modified from a known trusted state. Integrity of a component can be determined, for example, by generating a cryptographic measurement of the component, and verifying the cryptographic measurement against a trusted or known good value.

A "cryptographic measurement" may be generated from a sequence of bits, such as a message or software code using cryptographic functions (e.g., hash functions), resulting in a cryptographic string. Examples of such cryptographic functions may include SHA-1 (Secure Hash Algorithm-1), SHA-256 (Secure Hash Algorithm-256), etc. A cryptographic measurement may uniquely identify the sequence of bits using the cryptographic string so that no other cryptographic string may represent the same sequence of bits. The cryptographic measurement of a sequence of bits may be used to determine the integrity of the sequence of bits (i.e., the sequence of bits have not been tampered with). For example, a cryptographic measurement of an operating system may be checked against a stored value from a protected location to determine that the operating system has not been modified from its expected state.

A "digital fingerprint" is a value or string representing a summary of the state of the software and hardware components in a device. A digital fingerprint can be generated based on information collected about the individual components in a device, such as attestation values associated with the components.

An "attestation value" is a value or string representing the state of a software or hardware component. An attestation value can be used to indicate the presence, identity, and integrity of a component installed or available on a device.

The term "user data" is used to refer to data or information that is exchanged between a user device and a target device on a communication channel that is established after assessment of the trustworthiness of the target device. User data may be data or information stored on or accessible by user device that may be transferred to a target device, or data or information stored on or accessible by target device that may be transferred to a user device. Examples if user data may include sensitive information such as Personal Account Information (PAI) and/or Personal Identifying Information (PII), and non-sensitive information such as media files, etc. User data may also include commands transferred from a target device to a user device, or vice versa, for invoking a functionality or executing a program on the destination device.

FIG. 1 illustrates a system 100 with various examples of target devices that can interact with a user device 102, according to some embodiments. Although user device 102 is shown as a mobile device, it should be understood that other types of user devices can be used. User device 102 may interact with various types of target devices over a wired or wireless connection medium. For example, user device 102 may interact with a wireless access point device 152 to access a network such as the Internet, a stereo system 154 to play audio files stored on user device 102, a pointer device 156 to allow a user to control user device 102 via the pointer device 156, a POS device 158 to make a payment for a purchase of goods or services, a tablet device 160 to synchronize files between user device 102 and tablet device 160, or a display device 162 to display images or videos stored on user device 102, etc.

In some scenarios, user device 102 may act as a master device to control the functionality of a target device. For example, user device 102 may act as a master device to display device 162 to control the images being displayed on display device 162. A user device may also act as a slave device to accept control from a target device acting as a master device. For example, user device 102 may accept control from tablet device 160 to update files stored on user device 102. In some scenarios, the roles of user device 102 and a target device are not static and may change over time. For example, although user device 102 may accept control from tablet device 160 at one instance, user device 102 may switch from acting as a slave to a master to control tablet device 160 in another instance.

As shown, user device 102 may interact with a target device via a wireless connection using a suitable wireless protocol (e.g., Bluetooth, NFC, WiFi, etc.). Alternatively or additionally, user device 102 may interact with a target device via a wired connection (e.g., via a cable, connector, or adapter connection) using a suitable wired protocol (e.g., USB, HDMI, etc.). It should be understood that although multiple target devices are shown for ease of explanation, not all target devices shown need to be present at the same time, and that system 100 may include just one target device. Furthermore, other types of target devices not specifically shown (e.g., another mobile device, a computer, a keyboard, a printer, etc.) can be used.

Figure 2:
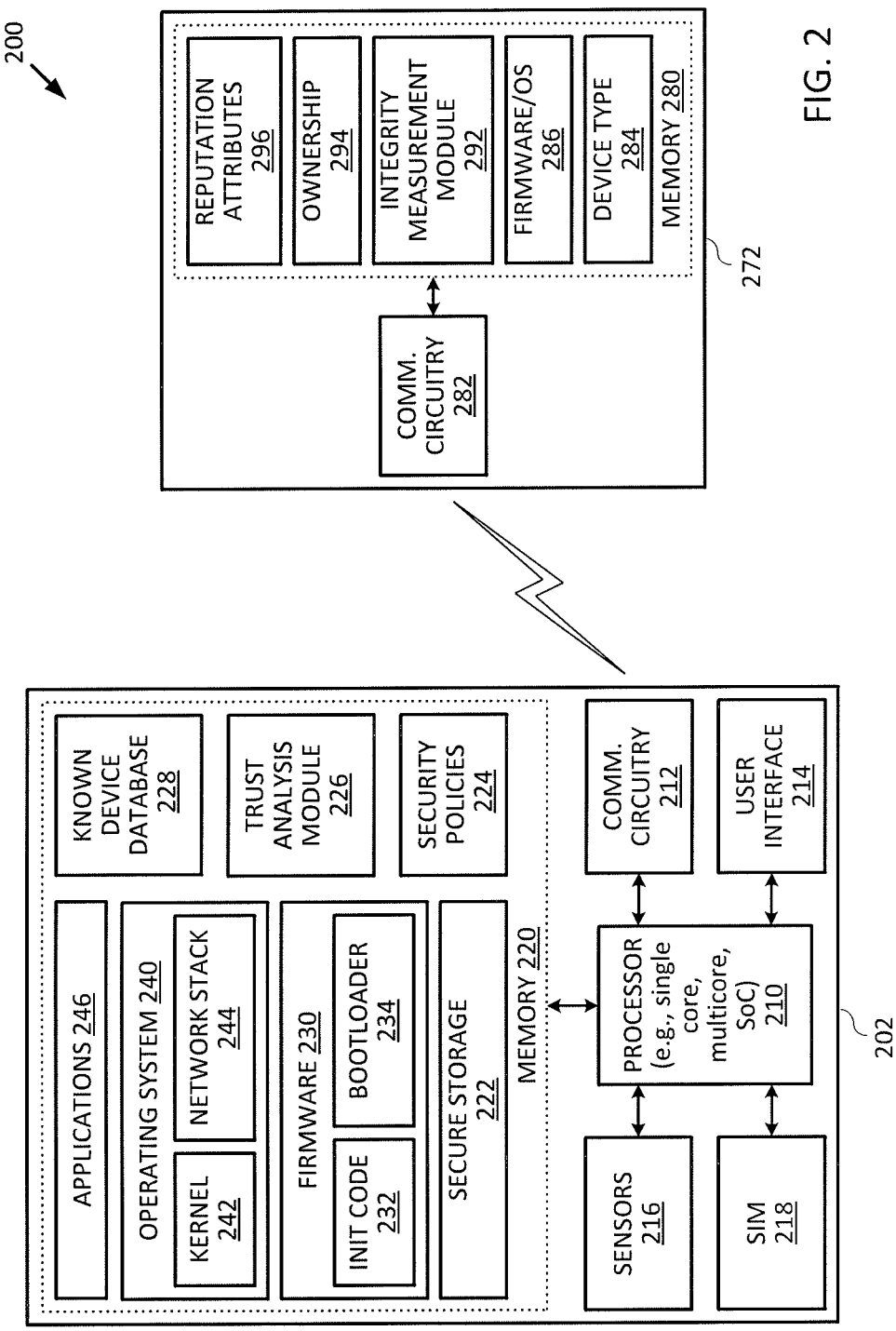
FIG. 2 illustrates an exemplary block diagram of a user device and a target device in accordance with some embodiments.

FIG. 2 illustrates a block diagram 200 of a user device 202 and a target device 272 that can interact with user device 202, according to some embodiments. User device 202 may include at least one processor 210 (e.g., single core or multi-core) coupled to at least one storage memory 220, user interface 214, one or more sensors 216, and communication circuitry 212. In some embodiments, (e.g., where user device 202 is a mobile device), user device 202 may also include a Subscriber Identity Module (SIM) card 218. It should be understood that a user device need not include all the components shown in FIG. 2, and that a user device can include additional components not explicitly shown.

Processor 210 can be implemented as one or more integrated circuits, e.g., one or more single core or multicore microprocessors and/or microcontrollers, and can be implemented as a system on a chip (SoC). In operation, processor 210 can control the operation of user device 202. In various embodiments, processor 210 can execute a variety of programs in response to executable code and can maintain multiple concurrently executing programs or processes. At any given time, some or all of the executable code can be resident in processor 210 and/or in storage media such as memory 220.

Memory 220 can be implemented, for example, using one or more semiconductor memories (e.g., DRAM, SRAM, ROM, EPROM, flash memory, etc.), magnetic storage media, or any other non-transitory storage medium, or a combination of media, and can include volatile and/or non-volatile media. In some embodiments, memory 220 can be partitioned into memory regions or separate components to store particular types of data or information.

For example, memory 220 may include a secure storage 222 for storing sensitive information and security sensitive applications. The sensitive information stored in secure storage 222 may include sensitive data such as cryptographic keys, security parameters, Personal Account Information (PAI), and/or Personal Identifying Information (PII). PII is information that can be used to identify an individual or user of user device 202. Examples of PII may include name of a user, address, birth date, social security number, phone number, etc. PAI is information that can be used to identify or access a financial account. Examples of PAI may include a primary account number (PAN) or other account identifiers, security or verification numbers/codes or resource for generating such codes (e.g., CVV2, dCVV, etc.), expiration date, routing number, personal identification number (PIN) associated with a financial account, etc. Secure storage 222 may provide a limited access interface that prohibits access to the secure storage area except for trusted applications and trusted entities or devices. In some embodiments, secure storage 222 can be implemented as a memory chip (e.g., an integrated memory chip in user device 202, or in a user removable memory card), as part of a secure element, as part of SIM card 218, or any combinations thereof.

Memory 220 can also be used to store firmware 230, an operating system 240, and applications 246. Firmware 230 is a set of protected code that interacts closely with hardware components of user device 202 and is executed during startup of user device 202. Firmware 230 may include initialization code 232 that is used to initialize and setup the hardware configuration of user device 202, and a boot loader 234 that is used to load operating system 240 during startup. After startup, firmware 230 may provide an interface through which operating system 240 can manage and control hardware components of user device 202. Firmware 230 can be stored in read-only or write-protected memory, and is updated infrequently or not at all during the lifetime of user device 202.

Operating system 240 can include kernel 242 and network stack 244. Kernel 242 provides an interface between software applications running on the user device 202 and system resources. For example, kernel 242 can process requests from applications and translates them into system calls to interact with system components of user device 202. Network stack 244 provides operating system 240 and applications with a software interface to communicate with external devices, such as a target device 272. Network stack 244 can also be used to set up secure communication channels to allow user device 202 to communicate securely with a target device.

Applications 246 can include personal information management applications (e.g., contacts applications, calendar applications, etc.), financial applications (e.g., mobile wallet applications, mobile banking applications, etc.), communication applications (e.g., email applications, text messaging applications, voice call applications, instant messaging applications, etc.), productivity applications (e.g., document viewer or editor applications, etc.), mapping applications (e.g., navigation applications, directory assistance applications, location sharing applications, etc.), web browser applications, social networking applications, photo or imaging applications (including video), media playback applications, video game applications, interface applications used for interacting with other devices (e.g., a target device), etc.

Memory 220 can also store data or information used by applications 246 such as media items (e.g., audio files, video files, image or artwork files, etc.), information about a user's contacts (names, addresses, phone numbers, etc.), information about a user's calendar (e.g., scheduled appointments and events, etc.), notes, and/or other types of user data or information.

Memory 220 may also store security policies 224, a trustworthiness analysis module 226, and a known-device database 228. In some embodiments, security policies 224, trustworthiness analysis module 226, and/or known-device database 228 can be stored in secure storage 222. Security policies 224 can include rules that manages and limits how components of user device 202 (e.g., applications 246, secure storage 222, stored data, etc.) interact with an external device (i.e. a target device such as target device 272). One or more of the security policies can be enforced on a communication channel between user device 202 and a target device by operating system 240. For example, security policies 224 may include access rules that define access controls such as read, write, and/or execute permissions to prevent an external device from accessing certain types of data such as sensitive information, or from executing certain types of applications such as financial applications or system function calls. Security policies 224 can also define what types of authentication protocol or credentials are necessary to gain permission for a particular type of access. For example, a target device may be allowed to read certain types of sensitive information, but additional authentication or credentials may be required before the target device can modify or overwrite the sensitive data. Security policies may also include encryption rules that define what types of encryption is used when exchanging data with a target device and/or which cryptographic keys to use for the encryption, and may include digital signature rules that define whether communications exchanging data between user device 202 and a target device should be digitally signed.

Trustworthiness analysis module 226 can include executable code to perform a trustworthiness analysis of a target device (i.e. assessing the trustworthiness of the target device) before allowing user data to be exchanged with the target device. Trustworthiness analysis module 226 can be included in a trusted computing base and be constructed through the system's chain of trust. The trustworthiness analysis or assessment can include determining which trustworthiness attributes to request from the target device (e.g., can be based on the location of the user device or the target device, what type of device is the target device, etc.), and requesting one or more trustworthiness attributes from the target device. Upon receiving the requested one or more trustworthiness attributes, trustworthiness analysis module 226 can evaluate the receive trustworthiness attributes of the target device, and determine whether to request additional credentials from the target device before exchanging user data with the target device, and which of the security policies 224 should be enforced when exchanging user data with the target device.

In some embodiments, trustworthiness analysis module 226 can determine or derive a trustworthiness score for the target device based on the received trustworthiness attributes. The trustworthiness score can be compared with a set of trustworthiness thresholds to determine the trust level of the target device. Each trust level can have a corresponding set of security policies defined. The one or more security policies to enforce on a communication channel when exchanging user data with the target device can then be determined based on the trust level of the target device by looking up the security policies corresponding to the trust level. The trustworthiness score can be stored in a known-device database 228 and be used to reduce the overhead of having to reassess the trustworthiness of the target device the next time the user device interacts with the target device. For example, instead of requesting one or more trustworthiness attributes form the target device the next time the two devices interact, user device 202 can retrieve the trustworthiness score of the target device from known-device database 228 and determine the security policies to enforce based on the retrieved trustworthiness score.

Although security policies 224, trustworthiness analysis module 226, and known-device database 228 have been describe above as being stored in memory 220 of user device 202, in some embodiments, one or more of these components can be stored on a trusted cloud storage device communicatively coupled to user device 202. Hence, the functionalities or operations described herein with respect to these components can be performed by user device 202, or by user device 202 via a trusted cloud storage device.

Communication circuitry 212 can include components used to connect and communicate with an external device (e.g., a target device such as target device 272). For example, communication circuitry 212 can include one or more antennae and supporting circuitry to provide a wireless interface to allow user device 202 to communicate wirelessly (e.g., via radio frequency) with various other devices using any one or more suitable protocols for wireless data communication (e.g., Bluetooth, NFC, WiFi, etc.). Communication circuitry 212 can be implemented using a combination of hardware (e.g., driver circuits, antennas, modulators, demodulators, encoders, decoders, and other analog and/or digital signal processing circuits) and software components. Multiple different wireless communication protocols and associated hardware can be incorporated into communication circuitry 212.

Communication circuitry 212 can additionally or alternatively include one or more connectors and supporting circuitry to provide a wired interface to allow user device 202 to communicate with various other devices via a wired communication path (e.g., using USB, UART, or other protocols for wired data communication, etc.). In some embodiments, the one or more connectors can also allow user device 202 to receive power, e.g., to charge an internal battery. In some embodiments, the one or more connectors can also provide connections (e.g., HDMI, etc.) for audio and/or video signals, which may be transmitted to or from user device 202 in analog and/or digital formats.

User interface 214 can include any combination of input and output elements. A user can operate input elements (e.g., microphone, buttons, camera, etc.) of user interface 214 to invoke the functionality of user device 202, and can view, hear, and/or otherwise experience output from user device 202 via output elements (e.g., a display screen, speakers, etc.) of user interface 214. Some user interface elements (e.g., a touchscreen, etc.) can provide both input and output functionalities.

Sensors 216 can include various electronic, mechanical, electromechanical, optical, or other devices that provide information related to external conditions around user device 202. Sensors 216 can include one or more of an accelerometer, a gyroscopic sensor, and/or a Global Positioning System (GPS) receiver to provide information about the location and/or motion of user device 202. For example, an accelerometer can sense acceleration in one or more directions, a gyroscopic sensor can sense rotational motion in one or more directions, and a Global Positioning System (GPS) receiver 248 can determine location based on signals received from GPS satellites.

User device 202 may also include SIM card 218 (e.g., in some embodiments in which user device 202 is a mobile device such as a mobile phone, tablet device, etc.). SIM card 218 is a user removable component that securely stores an international mobile subscriber identity (IMSI) and the related cryptographic keys used to identify and authenticate a subscriber or user of user device 202. SIM card 218 can additionally store other sensitive data and security sensitive applications as described above, and provide a trusted execution environment for the security sensitive applications to execute from. SIM card 218 can also be used as secure storage 222 or supplement secure storage 222.

Still referring to FIG. 2, target device 272 can include communication circuitry 282 coupled to a memory 280. It should also be understood that a target device need not include all the components shown in FIG. 2, and that a target device can include additional components not explicitly shown. For example, some target devices may additionally include one or more processors or controllers.

Communication circuitry 282 can include components that are used to interact with an external device (e.g., a user device such as user device 202). For example, communication circuitry 282 can include any of the components described above with reference to communication circuitry 212 (e.g., one or more antennae, connectors, supporting circuitry, etc.) to provide a wired or wireless interface for data communication. In some embodiments, communication circuitry 282 of target device 272 may be complementary to communication circuitry 212 of user device 202. For example, communication circuitry 282 of target device 272 may include a connector that is complementary to the connector of communication circuitry 212 of user device 202 such that the two connectors can mate and connect with each other.

Memory 280 can be implemented using any one or more combination of the technologies described above with reference to memory 220 of user device 202. Memory 280 can be used to store information that can be used by user device 202 to assess the trustworthiness of target device 272, or executable code that can be used to generate such information. For example, memory 280 can store device type information 284 that provides a description of the type of device that target device 272 is. Device type information 284 can include, for example, a device class identifying the device class of target device 272 (e.g., computer, access point device, audio/video peripheral, printer, storage device, etc.). In some embodiments, device type information 284 can also include a service class identifying what types of services can be provided by target device 272 (e.g., networking, output rendering, input capture, storage, etc.). In some embodiments, device type information 272 can be used to determine the role of target device 272 (e.g., whether target device 272 is a master or slave device to user device 202).

In some embodiments, memory 280 can store firmware and/or operating system (OS) 286 of target device 272 if target device 272 uses such components. The state of firmware/OS 286 can provide some indication of the trustworthiness of target device 272. For example, a target device with an un-tampered firmware and an up-to-date OS may be deemed more trustworthy than a target device with a modified firmware or an out-of-date operating system.

In some embodiments, an integrity measurement module 292 may include executable code for measuring the integrity of components of target device 272 such as firmware/OS 286 or other components of target device 272. Integrity measurement module 292 can be included in a trusted computing base and be constructed through the system's chain of trust. For example, integrity measurement module 292 can be used to generate a digital fingerprint or a cryptographic measurement of firmware/OS 286 to determine the state of firmware/OS 286. In some embodiments, integrity measurement module 292 can be stored locally in memory 280 of target device 272. In some embodiments, integrity measurement module 292 can be stored remotely, for example, in memory 220 of user device 202 or on a trusted cloud storage device communicatively coupled to user device 202, and integrity measurement module 292 can be executed from the remote storage to access and measure the integrity of components of target device 272.

In some embodiments, memory 280 can store device ownership information 294 of target device 272. Device ownership information 294 can identify an entity such as an individual or an organization that owns or operates target device 272. Device ownership information 294 can provide some indication of the trustworthiness of target device 272. For example, a target device that is owned or operated by the same user as user device 202 can be deemed more trustworthy that a target device that is owned or operated by an entity unknown to the user of user device 202.

In some embodiments, memory 280 can store reputation attributes 296 of target device 272. Reputation attributes 296 may include information relating to whether target device 272 or components of target device 272 originated from a trusted source. For example, reputation attributes 296 can include information identifying a manufacturer of target device 272, the source and/or version of firmware, operating system, and/or applications running on target device 272 or other components of target device 372, attestation values of components of target device 272 provided from a trusted source (e.g., attesting that target device 272 has the latest software/firmware updates, attesting that target device 272 has antivirus software installed, etc.), and/or a digital certificate issued from a trusted certificate authority, etc.

Figure 3:
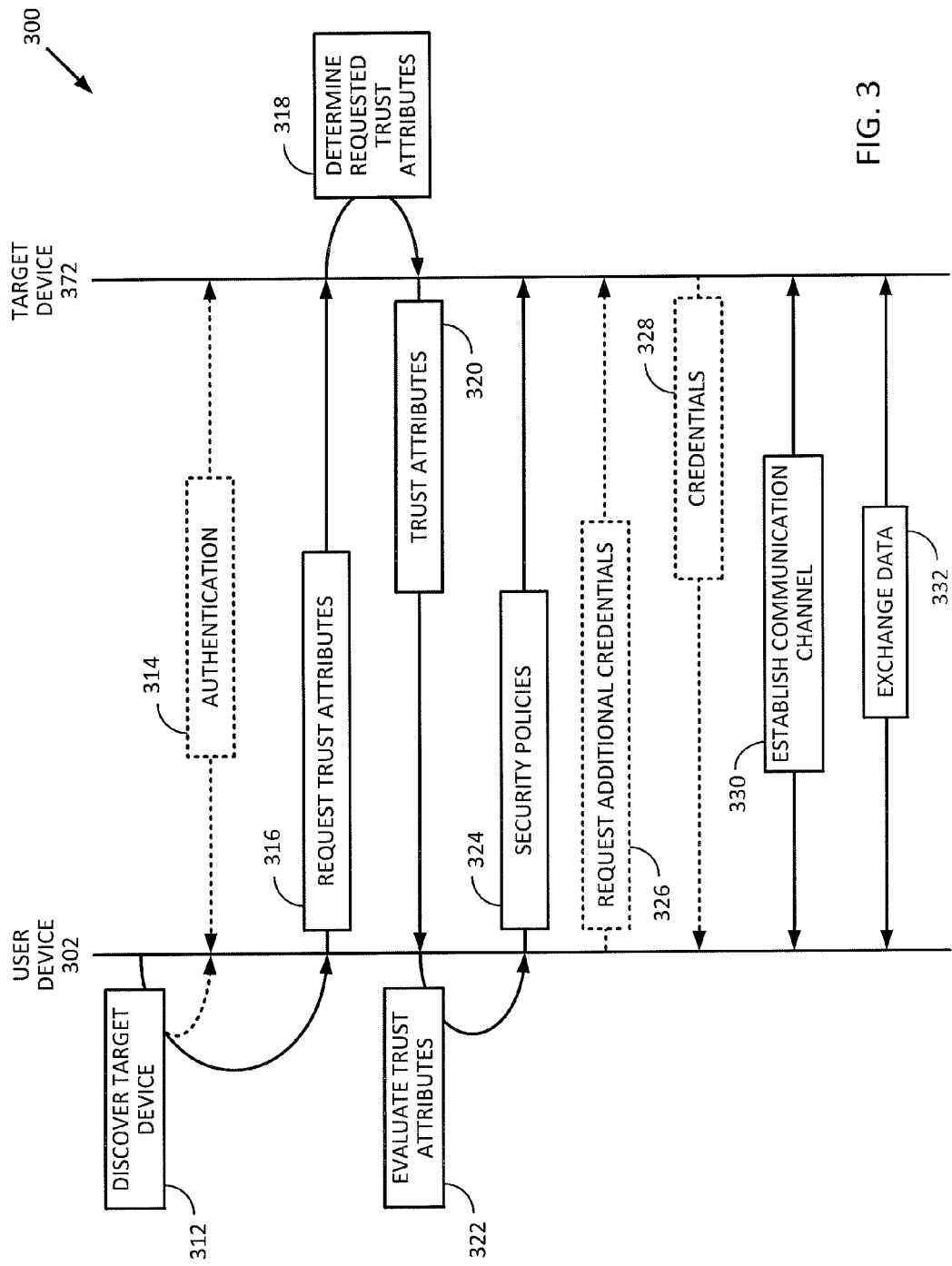
FIG. 3 illustrates an exemplary process for assessing the trustworthiness of a target device in accordance with some embodiments.

FIG. 3 shows a diagram illustrating a process 300, according to some embodiments. Process 300 can be used by a user device 302 such as user device 202 to assess the trustworthiness of a target device 372 such as target device 272 before allowing user data to be exchanged with target device 372. Process 300 can begin at block 312 with the discovery of target device 372 by user device 302, or vice versa. Device discovery can occur, for example, when user device 302 comes within a proximity distance to target device 372 that is within a suitable range for wireless communication between user device 302 and target device 372. The proximity distance may vary depending on the wireless communication technology being used (e.g., Bluetooth, NFC, WiFi, etc.). As another example, discovery can occur when user device 302 physically connects with target device 372, for example, when a connector or cable or adapter coupled to target device 372 is plugged into user device 302, or vice versa.

According to some embodiments, upon discovery of target device 372 and before exchanging user data with target device 372, user device 302 can determine a set of one or more trustworthiness attributes of target device 372 to request from target device 372 to assess the trustworthiness of target device 372. This determination can be made, for example, by trust analysis module 226, and the set of one or more trustworthiness attributes to request may depend on the location of user device 302 and/or the device type of target device 372 in some embodiments.

The location of user device 302 (e.g., as determined by a GPS receiver sensor of user device 302) can be assumed to also be the location of target device 372, because target device 372 is expected to be in close proximity to user device 302 in order for discovery 312 to have occurred. The threats and risks faced by user device 302 may change depending on the location of user device 302. For example, it is more likely that user device 302 may interact with an untrusted device when user device is at a public location than at the home of the user of user device 302.

In some embodiments, the location of user device 302 can be used to determine which one or more trustworthiness attributes to request from target device 372—that is, the one or more trustworthiness attributes of target device 372 requested by user device 302 can vary depending on the location of user device 302. In other words, when user device 302 is at one location, the one or more trustworthiness attributes being requested may include a first set of trustworthiness attributes. And when user device 302 is at a second location, the one or more trustworthiness attributes being requested may include a second set of trustworthiness attributes having at least one trustworthiness attribute that is not in the first set of trustworthiness attributes.

For example, when user device 302 is at the home of the user, the one or more trustworthiness attributes being requested may include an integrity measurement of target device 372 and a trustworthiness reputation of the target device 372, but not the ownership of target device 372. The ownership of target device 372 can be omitted in some embodiments because the devices at a user's home are likely to be owned by the user. Whereas, when user device 302 is at a public location, the one or more trustworthiness attributes being requested may include an integrity measurement of target device 372, a trustworthiness reputation of the target device 372, as well as the ownership of target device 372, because it is likely that user device 302 will come in proximity with target devices own by unfamiliar entities. As another example, when user device 302 is at the workplace of the user, the one or more trustworthiness attributes being requested may include the ownership of target device 372, an integrity measurement of target device 372, but not a trustworthiness reputation of target device 372. The trustworthiness reputation of target device 372 can be omitted in some embodiments because it is likely that the user's workplace prohibits the use of devices that originate from unknown or untrusted sources. It should be understood that these are just examples, and that various embodiments can request other combinations of trustworthiness attributes depending on the location of user device 302, and that some embodiments may request the same set of trustworthiness attributes regardless of the location of user device 302.

According to some embodiments, target device 372 may provide its device type to user device 302 as part of the discovery process, or upon request by user device 302. The device type of target device 372 may be used in assessing the trustworthiness of target device 372, because the threats and risks faced by user device 302 may change depending on the device type of target device 372. For example, a target device such as a computer having an operating system is more likely to be infected with malware that may access sensitive information on user device 302 than a basic input device such as a pointing device (e.g., a mouse) that may not have an operating system. As another example, the risk that target device 372 may access sensitive information on user device 302 without authorization is higher when target device 372 is acting as a master device to user device 302 than when target device 372 is acting as a slave device to user device 302.

In some embodiments, the device type of target device 372 can be used to determine which one or more trustworthiness attributes to request from target device 372—that is, the one or more trustworthiness attributes of target device 372 requested by user device 302 can vary depending on the device type of target device 372. In other words, if target device 372 is a first type of device, the one or more trustworthiness attributes being requested may include a first set of trustworthiness attributes. And if target device 372 is a second type of device, the one or more trustworthiness attributes being requested may include a second set of trustworthiness attributes having at least one trustworthiness attribute that is not in the first set of trustworthiness attributes.

For example, if target device 372 is an input device (e.g., a keyboard, a pointing device, or a microphone), the one or more trustworthiness attributes being requested may include the ownership of target device 372 and a trustworthiness reputation of target device 372, but not an integrity measurement of target device 372. The integrity measurement of target device 372 can be omitted in some embodiments because such input devices may not have its own operating system and thus is less susceptible to malware and virus infections. Furthermore, some target devices may not have the capability to provide an integrity measurement, for example, if the target device does not an operating system to measure. Whereas, if target device 302 is computing device (e.g., a mobile device, a computer, etc.) that has its own operating system, the one or more trustworthiness attributes being requested may include an integrity measurement of target device 372 in addition to the trustworthiness reputation of the target device 372 and the ownership of target device 372. It should be understood that these are just examples, and that various embodiments can request other combinations of trustworthiness attributes depending on the device type or role of target device 372, and that some embodiments may request the same set of trustworthiness attributes regardless of the device type of target device 372.

Referring back to FIG. 3, in some embodiments, after device discovery at block 312 and before user device 302 requests trustworthiness attributes of target device 372, an optional authentication process may be performed at block 314 between user device 302 and target device 372. For example, the authentication process may involve the transfer of a passcode, password, PIN, etc. from one device to the other, and may also include a username or user identifier. The authentication process may adhere to the communication protocol that is being used to establish the connection between user device 302 and target device 372 (e.g., a WiFi Protected Access (WPA) passcode for WiFi, PIN code for Bluetooth pairing, etc.). As another example, the authentication process may be a challenge-response authentication process involving the exchange of a cryptographic challenge and response between user device 302 and target device 372. The authentication process may be used to provide some initial verification of the identity of the respective devices before proceeding further with process 300. Failure of completing or passing the authentication process (e.g., due to wrong or unknown passcode, password, cryptographic response, etc.) may indicate that target device 372 is an untrusted device, and user device 302 may disable its connection with target device 372 or reattempt the authentication process.

User device 302 may then send a request for one or more trustworthiness attributes of target device 372 at block 316. In some embodiments, the one or more trustworthiness attributes being requested can be based on the location of user device 302 and/or the device type of target device 372 as described above. The one or more trustworthiness attributes may include any combination of one or more of an ownership of target device 372 (e.g., entity that owns or operates target device 372), an integrity measurement of target device 372 (e.g., a digital fingerprint or cryptographic measurement of a component of target device such as firmware, operating system, applications, etc.), or a trustworthiness reputation of target device 372 (e.g., manufacturer, source and/or version of components of target device 272, attestation values of components of target device 272, and/or a digital certificate, etc.).

In response, target device 372 may perform a determination of the requested one or more trustworthiness attributes at block 318. For example, target device 372 may retrieve the requested trustworthiness attributes from memory. In some embodiments, when the requested trustworthiness attributes include an integrity measurement of a component of target device 372, an integrity measurement module 292 can be used to derive a digital fingerprint or a cryptographic measurement of the component. The requested trustworthiness attributes 320 are then provided to user device 302. In some embodiments, if a particular trustworthiness attribute is not available, target device 372 may respond to user device 302 indicating that target device 372 does not have information relating to the requested trustworthiness attribute. In some embodiments, target device 372 may provide information that can be used to determine a requested trustworthiness attribute instead of the trustworthiness attribute itself. For example, target device 372 may provide an image of the operating system to user device 302 such that an integrity measurement of the operating system can be performed by user device 302 or a trusted cloud storage device.

According to some embodiments, each of the trustworthiness attributes can be requested and received serially. In other words, user device 302 may send a request for a first trustworthiness attribute, and wait until the requested trustworthiness attribute is received before sending a request for a second trustworthiness attribute. In such embodiments, each received trustworthiness attribute can be evaluated by user device 302 (e.g., using trust analysis module 226) to decide which trustworthiness attribute to request next, or to decide whether the received trustworthiness attributes thus far provide sufficient information to assess the trustworthiness of target device 372. For example, user device 302 may request an attestation value from target device 372 to indicate whether target device 372 has the latest operating system updates. If the attestation value received from target device 372 indicates that target device 372 does not have the latest operating system updates, user device 302 may decide to request an integrity measurement of the operating system. Whereas, if the attestation value received from target device 372 indicates that target device 372 has the latest operating system updates, user device 302 may decide to request an attestation value to indicate whether target device 372 has antivirus software installed instead. As another example, user device 302 may request an ownership of target device 372. If the received ownership of target device 372 indicates that target device is owned by the same user, user device 302 may decide that no additional trustworthiness attributes are needed. If the received ownership of target device 372 indicates that target device is owned by a user contact on the user's contact list or by a merchant that the user frequently makes purchases from, user device 302 may decide to additionally request an integrity measurement of the operating system of target device 372 to ensure the target device operated by an entity known to the user has not been inadvertently hacked. If the received ownership of target device 372 indicates that target device 372 is owned by an unknown entity, multiple additional trustworthiness attributes may be requested to further assess the trustworthiness of target device 372.

Upon receiving the trustworthiness attributes from target device 372, user device 302 can perform an evaluation of the received trustworthiness attributes at block 322 to assess the trustworthiness of target device 372. The evaluation or assessment can be performed, for example, by trust analysis module 226. In some embodiments, a trustworthiness score of target device 372 can be determined based on the received one or more trustworthiness attributes. For example, each received trustworthiness attribute may be assigned a value, and the corresponding values of the received trustworthiness attributes can be aggregated to derive at a numeric value representing the trustworthiness score of target device 372. For example, an ownership indicating target device 372 is owned by the user may be assigned a higher value than an ownership indicating the target device is owned by a user contact of the user, which in turn may be assigned a higher value that an ownership indicating the target device is owned by an unknown entity. As another example, a version number of the operating system indicating that target device 372 has the latest operating system may be assigned a higher value than an older version number, and each successive older version may have a lower value assigned. In some embodiments, the trustworthiness score can be represented as a percentage of the actual aggregated value out of the highest possible aggregated value.

In some embodiments, the trustworthiness score can also be adjusted based on the location of user device 302 and/or the device type of target device 372. For example, the trustworthiness score of target device 372 may be adjusted upward if user device 302 is at a relatively safe location such as the user's home or workplace. As another example, the trustworthiness score of target device 372 may be adjusted upward if target device 372 is acting as a slave device to user device 302 because the threats and risks posed by a slave target device may be lower than if target device 372 is acting as a master device that can assume control of user device 302.

According to some embodiments, the trustworthiness score of target device 372 can be compared with a set of trustworthiness thresholds to determine a set of one or more security rules to enforce on a communication channel used for changing user data with target device 372, and/or to determine if addition credentials should be requested from target device 372 before permitting user data to be exchanged with target device 372. The trustworthiness thresholds can be correlated with different trust levels to indicate the trustworthiness of target device 372.

Figures 4, 5:
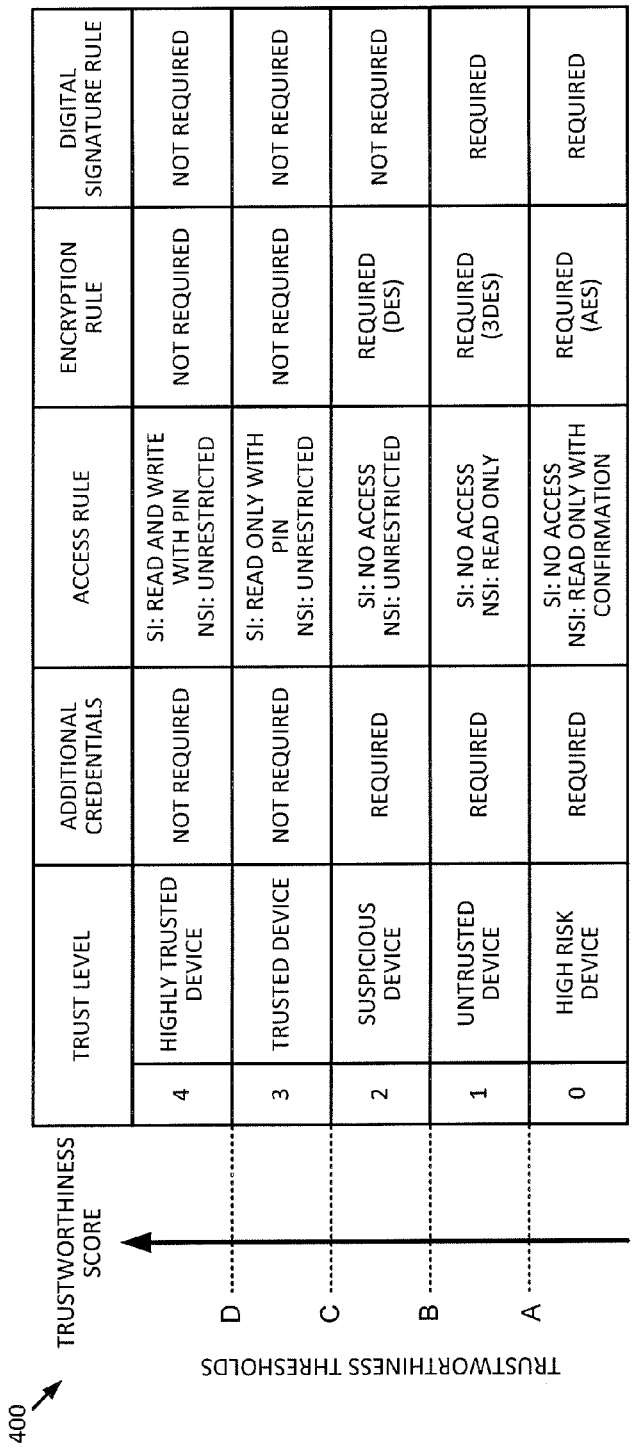
FIG. 4 illustrates exemplary trust levels of a target device in accordance with some embodiments.
FIG. 5 illustrates exemplary data fields in a known-device database in accordance with some embodiments.

FIG. 4 illustrates a diagram 400 of possible trust levels of a target device (e.g., target device 372), according to some embodiments. The information shown in FIG. 4 can be stored, for example, in security polices 224 of user device 302 for use by trusted analysis module 226 in process 300. In the example shown, four trust worthiness thresholds A-D can be used to defined five levels of trustworthiness of a target device (e.g., trust level 0 through 4, where a higher trust level refers to a more trustworthiness device). It should be understood that in various embodiments, a fewer or greater number of thresholds and trust levels can be used.

In some embodiments, a target device with a trustworthiness score that is below the minimum threshold A may be categorized as a high risk device or have a trust level of 0. A target device with a trustworthiness score between the minimum threshold A and the next threshold B may be categorized an untrusted device or have a trust level of 1. A target device with a trustworthiness score between the threshold B and the next threshold C may be categorized as a suspicious device or have a trust level of 2. A target device with a trustworthiness score between the threshold C and the next threshold D may be categorized a trusted device or have a trust level of 3. A target device with a trustworthiness score above the highest threshold D may be categorized a highly trusted device or have a trust level of 4.

In some embodiments, the trustworthiness thresholds A-D may be dynamic and can change depending on the location of the user device and/or depending on the device type or role of the target device. As discussed above, the risks and threats faces by a user device may change based on the location of the user device or the device type or role of the target device. Thus, the trustworthiness thresholds can be dynamically adjusted to account for the change in risks and threats. For example, when the user device is at the home of the user, the trustworthiness thresholds can be adjusted downward such that a particular trust level can be achieved with a lower trustworthiness score than when the user device is at other locations. In some embodiments, the trustworthiness thresholds can be adjusted proportionally (i.e. all thresholds are adjusted by a certain amount) or disproportionally (i.e. some thresholds are adjusted more than others, or some thresholds may remain the same while others are adjusted).

In some embodiments, each trust level may be correlated with an indication of whether addition credentials are required before allowing user data to be exchanged with a target device having the corresponding trust level. For example, for a suspicious, untrusted, or highly untrusted target device, the user device may require additional credentials from the target device before exchanging user data with the target device; whereas for a trusted or highly trusted target device, the additional credentials may not be required.

In some embodiments, each trust level may be correlated with a set of one or more security policies to enforce when exchanging user data with a target device having the corresponding trust level. Examples of security policies may include access rules, encryption rules, and/or digital signature rules. An access rule may provide a restriction on, for example, the type of data or information or memory region of the user device that can be accessed by target device, the type of access that can be performed (e.g., read, write, execute, etc.), and/or how the access is performed (e.g., requirement of user confirmation to allow access, additional credentials such as a PIN or cryptographic challenge-response, etc.).

Referring to FIG. 4, in some embodiments, the access rule for a high risk target device may prohibit the high risk target device from any type of access to sensitive information (SI) such as PII, PAI, etc. or secure storage on a user device, and may restrict access to non-sensitive information (NSI) to only read access after user confirmation. The access rule for an untrusted target device may prohibit any type of access to sensitive information or secure storage on a user device, and may restrict access to non-sensitive information to only read access without requiring user confirmation. The access rule for a suspicious target device may prohibit any type of access to sensitive information or secure storage on a user device, but allows unrestricted access to non-sensitive information. The access rule for a trusted target device may prohibit write access to sensitive information or secure storage, require credentials (e.g., a PIN or cryptographic challenge-response) for read access to sensitive information or secure storage, and allow unrestricted access to non-sensitive information. The access rule for a highly trusted target device may require credentials (e.g., a PIN or cryptographic challenge-response)

for read or write access to sensitive information or secure storage on a user device, and allow unrestricted access to non-sensitive information. In some embodiments, an access rule may include other access restrictions such as a restriction on whether applications stored at certain memory locations in user device can be executed by a target device, whether a target device can install or store applications to a memory region of user device, etc.

In some embodiments, the security policies may include an encryption rule to enforce on the data being exchanged between the user device and the target device. An encryption rule may indicate whether the data being exchanged is to be encrypted or not, as well as what type of cryptographic key or encryption algorithm is used. Cryptographic keys with longer bit lengths or more complex and secure encryption algorithms may be used for lower trust level devices. For example, the encryption rule for a high risk target device may require the data being exchanged to be encrypted using AES (Advanced Encryption Standard); the encryption rule for an untrusted target device may require the data being exchanged to be encrypted using 3DES or Triple-DES (Data Encryption Standard); the encryption rule for a suspicious target device may require the data being exchanged to be encrypted using DES; and the encryption rule for a trusted or highly trusted target device may not require encryption to be performed on the data being exchanged between user device and the target device.

In some embodiments, the security policies may also include a digital signature rule to enforce on the data being exchanged between the user device and the target device. A digital signature rule may indicate whether the data being exchanged is to be signed with a valid digital certificate or not. In some embodiments, a digital signature rule may also define the type of digital signature algorithm used, such as RSA (Rivest-Shamir-Adleman), DSA (Digital Signature Algorithm), etc. For example, the digital signature rule for a highly untrusted or untrusted target device may require the data being exchanged between the user device and the target device to be digitally signed; whereas the digital signature rule for a suspicious, trusted, or highly trusted device may not require the data being exchanged between the user device and the target device to be digitally signed.

It should be understood that the security policies described above are just examples, and that in various embodiments, other combinations of the various rules and a fewer or greater number or rules can be used for implementing the security policies for the various trust levels of a target device. For example, in some embodiments, a high risk device may be completely restricted from exchanging data with a user device.

It should also be understood that the trustworthiness of a target device may change over time. Hence, the particular additional credentials and/or security policies enforced when exchanging data for a particular target device may vary over time, depending on the assessment of the trustworthiness of the target device at that moment in time.

Referring back to FIG. 3, after user device 302 has evaluated the one or more trustworthiness attributes of target device 372 at block 322 and determined the set of one or more security policies to enforce when exchanging user data with target device 372 (e.g., using the techniques described with reference to FIG. 4), user device 302 can provide the set of one or more security policies to target device 372 at block 324 to facilitate enforcement of the policies. For example, the security policies provided to target device 372 may instruct target device 372 to use a certain cryptographic key to encrypt the user data to be exchanged with user device 302. In some embodiments, a subset of the security policies can be provided to target device 372.

At block 326, user device may optionally request addition credentials from target device 372 (e.g., if target device 372 is a suspicious, untrusted, or high risk device) before exchanging user data with target device 372. In some embodiments, the additional credentials being requested may be a passcode, password, or PIN, etc. and may also include a username or user identifier, or may include a cryptographic challenge-response (e.g., requesting target device 372 to encrypt or decrypt a random number or message) or a cryptographic key exchange, etc. If an authentication process were previously performed between user device 302 and target device 372 at block 314, the additional credentials requested at block 326 may include, for example, a second cryptographic challenge-response using a different random number or message than what was used during the authentication process at block 314.

At block 328, target device 372 may respond to user device 302 with the requested additional credentials. If the additional credentials provided by target device 372 cannot be authenticated, user device 302 may disable its connection with target device 372 or resend the request for additional credentials to target device 372 or restart process 300.

At block 330, user device 302 and target device 372 establish a communication channel to exchange user data on the wired or wireless connection between the two devices. In some embodiments, the communication channel can be a secure communication channel such as TLS or SSL, and the additional credentials requested at block 326 can be used to facilitate establishment of the secure communication channel. After establishing the communication channel at 330, user device 302 and target device 372 can begin exchanging user data at block 332.

In some embodiments, a target device 372 may switch roles from acting as a slave device to master device when exchanging user data with user device 302. In such embodiments, when user device 302 detects a change in the role of target device 372 (e.g., target device 372 requests control of user device 302), user device 302 may repeat steps 316-322 to request additional trustworthiness attributes from target device 372 and reassess the trustworthiness of target device 372 based on the new role of target device 372. In some embodiments, user device 302 may disable the established communication channel used for exchanging user data before reassessing the trustworthiness of target device 372.

According to some embodiments, the trustworthiness score of target device 372 can be stored in a known-device database such as known-device database 228 to reduce the amount of overhead for assessing the trustworthiness of target device 372 the next time user device 302 interacts with target device 372. In other words, instead of requesting the one or more trustworthiness attributes again when establishing a subsequent communication channel with the target device 372, the stored trustworthiness score can be used. FIG. 5 illustrates an example of the data fields that may be used for entries in a known-device database, according to some embodiments. A know-device database may store various information relating to a target device that a user device has previously interacted with. For example, known-device database may store for each known target device a device identifier identifying the target device (e.g., device identification number, device alias, Internet Protocol (IP) address, media access control address (MAC) address, etc.) a device type of the target device, and the previously determined trustworthiness score of the target device can be stored. In subsequent interactions with the target device, the trustworthiness score stored in the known-device database can be retrieved and be used by the user device to determine the security policies to enforce when exchanging user data with the target device.

In some embodiments, the stored trustworthiness score may have an expiration time associated with it to define a predetermined time period that the stored trustworthiness score is valid for. The state and hence the trustworthiness of a target device may change over time. Thus, depending on the age of the stored trustworthiness score, a user device may decide to request updated trustworthiness attributes from the target device, and derive an updated trustworthiness score based on updated trustworthiness attributes, such that the stored trustworthiness score is not used for establishing a subsequent communication channel with the target device after the predetermined time period has elapsed. The expiration time or predetermined time period can be, for example, an hour, a day, a week, etc. measured from the last time the trustworthiness score was derived for the particular target device. In some embodiments, the expiration time or predetermined time period can be based on the number of times the user device has interacted with the target device (e.g., the stored trustworthiness score expires every 5, 10, or 15 times that the user device interacts with the target device). In some embodiments, a stored trustworthiness score may also expire if the target device switches roles.

The known-device database may also store user behavior information relating to historic interactions with a target device. User behavior may include one or more of the total number of times that the user device has interacted or exchanged user data with a target device, the location of such interactions, a frequency of the interactions (e.g., number of times per day, week, month, etc.), historic trustworthiness scores of the target device, etc. In some embodiments, the user behavior information may be used when reassessing the trustworthiness score of a target device. For example, if user behavior information indicates that the user device interacts with the target device frequently, this may be an indication that the target device is more trustworthy than a device that the user seldom interacts with. Hence, when assessing the trustworthiness score of a target device, the user behavior information stored in the known-device database may be used to adjust the trustworthiness score of a target device (e.g., increase the trustworthiness score based on the number or frequency of times the devices have interacted, decrease the trustworthiness score if historic scores have been low, etc.).

Figure 6:
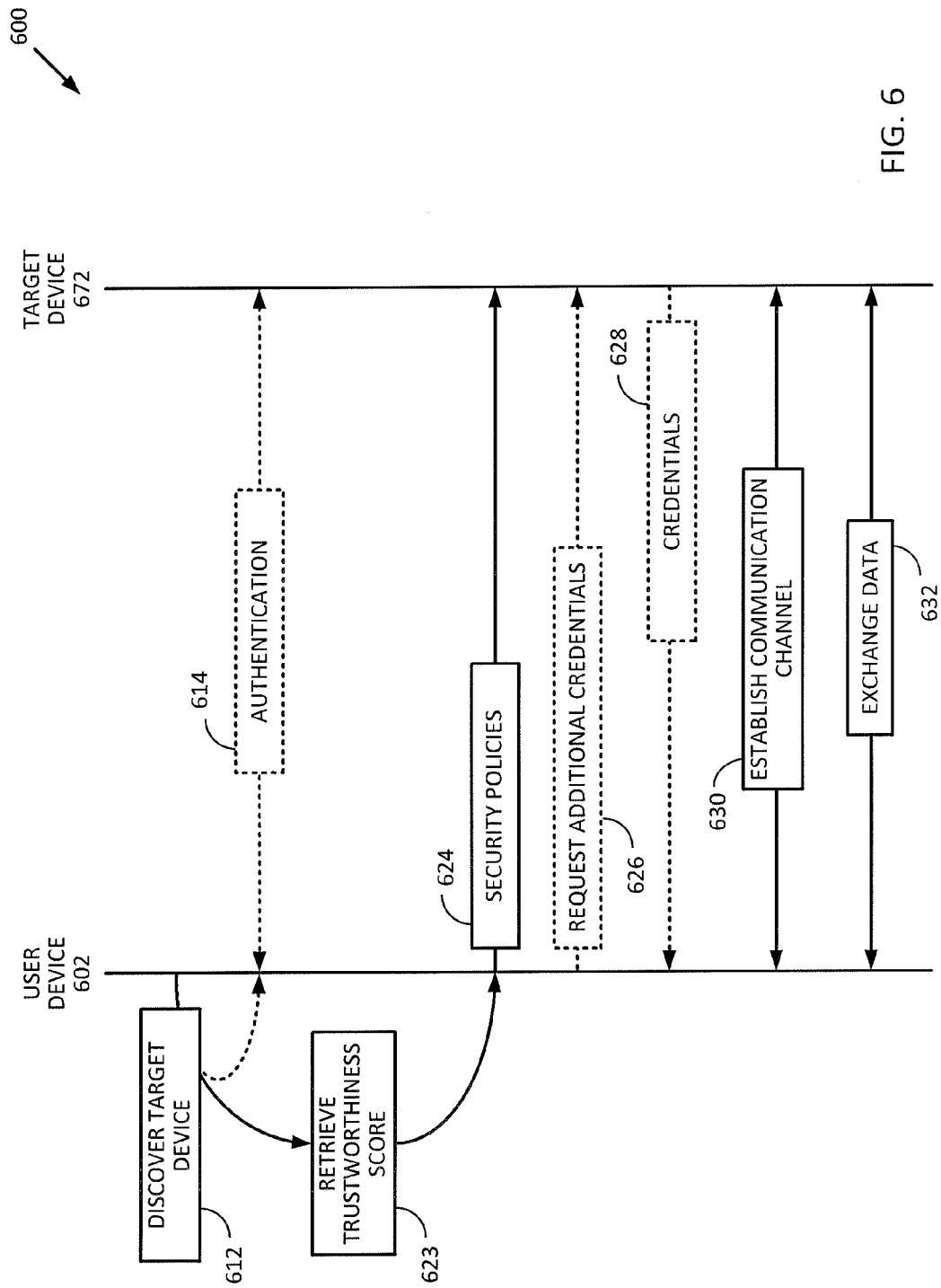
FIG. 6 illustrates another exemplary process for assessing the trustworthiness of a target device in accordance with some embodiments.

FIG. 6 shows a diagram illustrating a process 600, according to some embodiments. Process 600 can be used by a user device 602 such as user device 202 to assess the trustworthiness of a target device 672 such as target device 272 based on a stored trustworthiness score before allowing user data to be exchanged with target device 672. Reference indicators with similar numbering as those of FIG. 3 refers to similar operations, and thus a detailed description of which need not be repeated.

Process 600 may begin at block 612 in which device discover of target device 672 occurs (e.g., using techniques described above). If target device 672 is recognized as a device that user device 602 has previously interacted with (e.g., by comparing the device identifier of target device 672 with the store device identifiers in a known-device database), user device 602 may retrieve the last know trustworthiness score of target device 672 from a known-device database. The retrieved trustworthiness score can be optionally adjusted, for example, by user behavior information relating to target device 672, and the retrieved or subsequently adjusted trustworthiness score can be used to determine the set of one or more security policies to enforce when exchanging user data with target device 672 (e.g., comparing the retrieved or subsequently adjusted trustworthiness score with a set of trustworthiness thresholds using the techniques described with reference to FIG. 4).

At block 624, user device 602 can provide the set of one or more security policies to target device 672 to facilitate enforcement of the policies. At block 626, user device may optionally request addition credentials from target device 672 before exchanging user data with target device 672. At block 628, target device 672 may respond to user device 602 with the requested additional credentials. If the additional credentials provided by target device 672 cannot be authenticated, user device 602 may disable its connection with target device 672 or resend the request for additional credentials to target device 672, or restart process 600. At block 630, user device 602 and target device 672 establish a communication channel to exchange user data on the wired or wireless connection between the two devices. After establishing the communication channel at block 630, user device 602 and target device 672 can begin exchanging user data at block 632.

Figure 7:
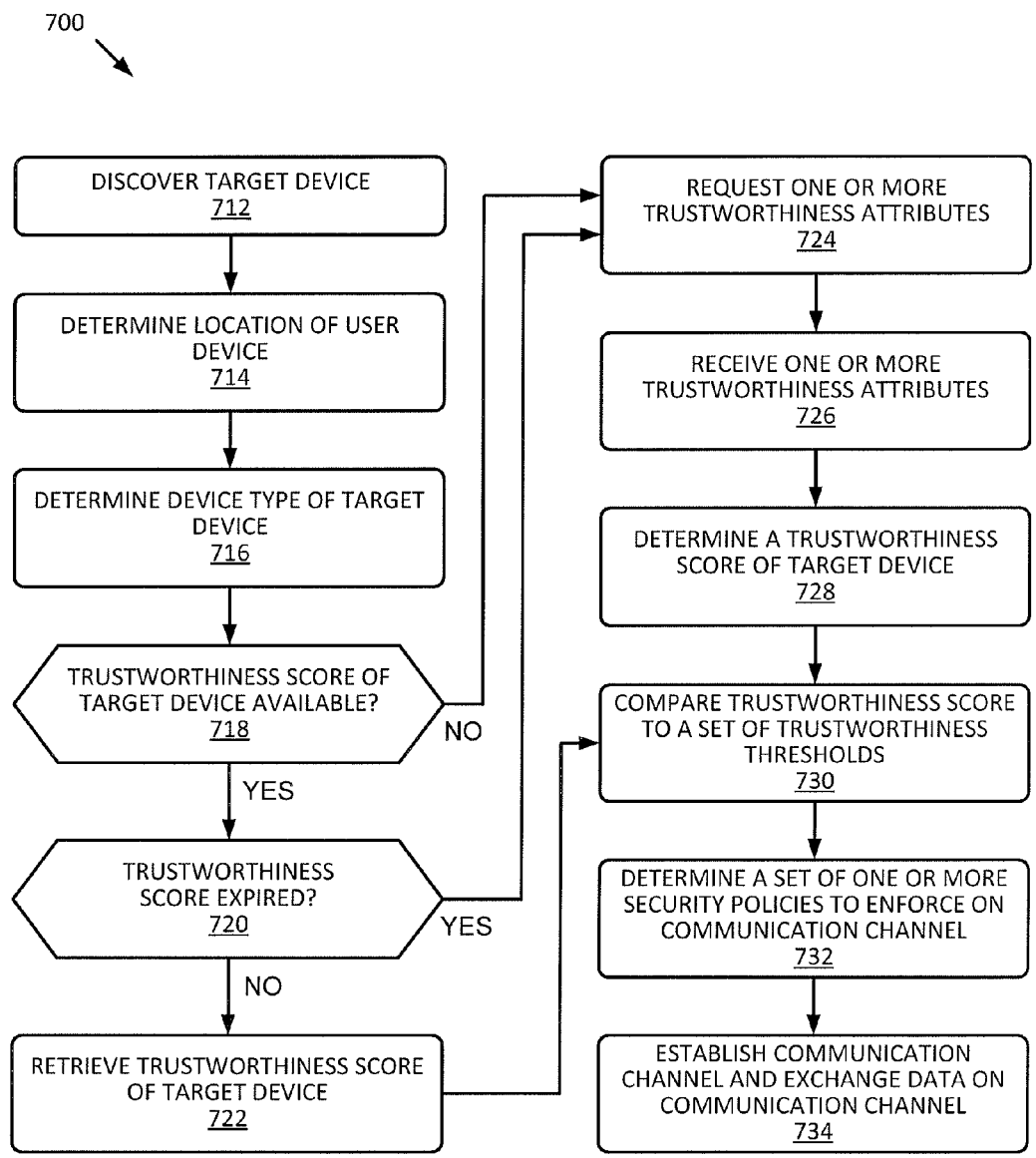
FIG. 7 illustrates an exemplary flow diagram of a process performed by a user device when interacting with a target device in accordance with some embodiments.

FIG. 7 illustrates a flow diagram of a process 700 that can be performed by a user device for assessing the trustworthiness of a target device, according to some embodiments. The details of the various operations have been previously described, and thus a detailed description of which need not be repeated. At block 712, device discover of the target device occurs. At block 714, the location of the user device can be determined. At block 716, the device type of the target device is determined. In some embodiments, the location of the user device and the device type of the target device can be used to determine which one or more trustworthiness to request and/or the sequence or order of the trustworthiness attribute to request at block 724. In some embodiments, the location of the user device and the device type of the target device can be used to adjust the trustworthiness score of the target device determined at block 728 or the trustworthiness score retrieved at block 722, or be used to adjust the trustworthiness thresholds used at block 730.

At bock 718, process 700 determines if the trustworthiness score of the target device is available in a known-device database. If the trustworthiness score of the target device is available from a known-device database, then at block 720, process 700 determines if the stored trustworthiness score of the target device has expired. If the stored trustworthiness score of the target device has not yet expired, then the trustworthiness score of the target device is retrieved from the known-device database for use at block 730.

If the trustworthiness score of the target device is not available (e.g., the target device has not previously interacted with user device), or if the stored trustworthiness score of the target device has expired, then at block 724, the user device may request one or more trustworthiness attributes of the target device. At block 726, the one or more trustworthiness attributes of the target device is received by the user device. In some embodiments, if multiple trustworthiness attributes are being requested, each of the trustworthiness attributes can be requested and received serially one after the other. At block 728, the trustworthiness score of the target device is determined, for example, by aggregating numeric values associated with the received trustworthiness attributes.

At block 730, the trustworthiness score determined at block 728 or the stored trustworthiness score retrieved at block 722 can be optionally adjusted as described above, and may be compared with a set of trustworthiness thresholds. At block 732, a set of one or more security policies to enforce on a communication channel when exchanging user data with the target device is determined based on the comparison performs at block 730 (e.g., using the techniques described with reference to FIG. 4). At block 734, the user device can establish a communication channel with the target device, and can begin exchanging user data on the communication channel according to the one or more security policies determined at block 732.

Figure 8:
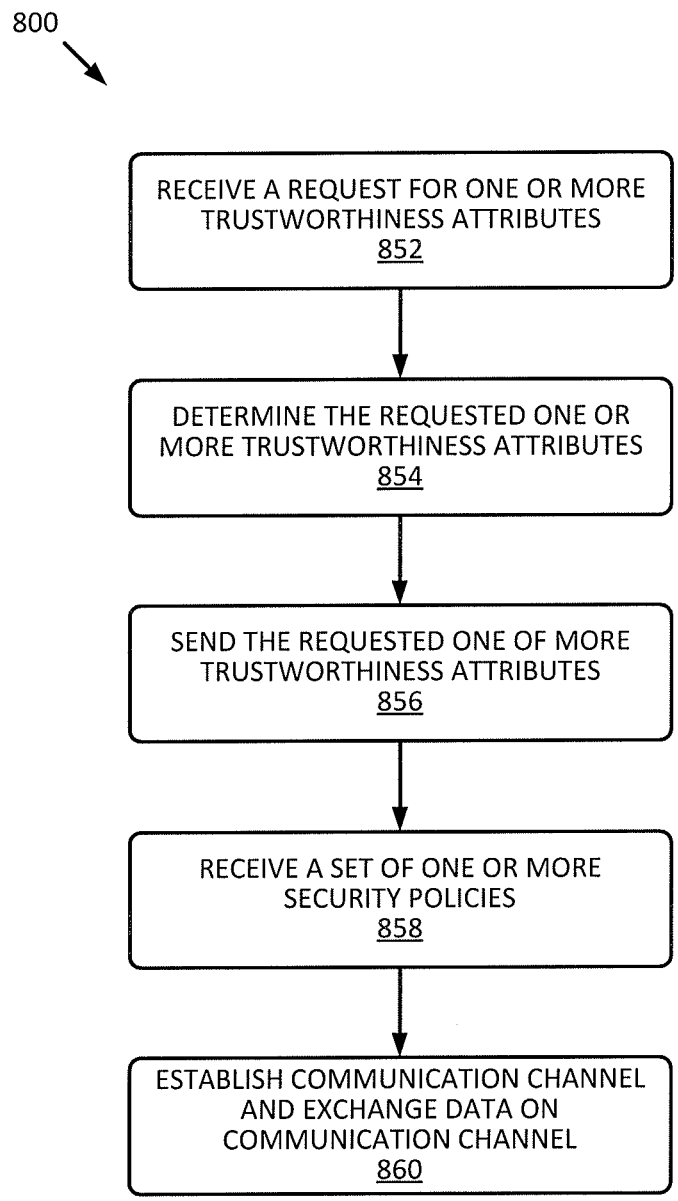
FIG. 8 illustrates an exemplary flow diagram of a process performed by a target device when interacting with a user device in accordance with some embodiments.

FIG. 8 illustrates a flow diagram of a process 800 that can be performed by a target device when interacting with a user device, according to some embodiments. The details of the various operations have been previously described, and thus a detailed description of which need not be repeated. At block 852, a request for one or more trustworthiness attributes of the target device is received from the user device. At block 854, process 800 determines the one or more trustworthiness attributes being requested by the user device. At block 856, the requested one or more trustworthiness attributes or information that can be used to derived the one or more trustworthiness attributes are sent to the user device. At block 858, a set of one or more security policies to enforce on a communication channel used for exchanging user data with the user device is received. At block 860, the target device can establish a communication channel with the user device, and can begin exchanging user data on the communication channel according to the one or more security policies received at block 858.

Accordingly, by determining the trustworthiness of a target device using trustworthiness attributes that provide an indication of the state and/or trust level of a target device before allowing user data communication, a user device can effectively put in place a set of one or more security rules to enforce on the user data communication to prevent unauthorized access to sensitive information or applications stored on user device.

In some embodiments, the techniques described herein can be used to enhance the security of financial transactions such as payment transactions being conducted by a user device (e.g., a mobile device such as a mobile phone executing a financial application, a security token such as a payment card, etc.) via a target device (e.g., a POS device). For example, when conducting a payment transaction, the user device may discover a POS device by coming into close proximity with the POS device (e.g, via NFC, etc.) at the checkout station at a merchant location. Before transmitting sensitive information such as Personal Account Information (PAI) (e.g., a primary account number, etc,) to the POS device, the user device may request one or more trustworthiness attributes from the POS device to verify that the POS device has not been hacked or otherwise been compromised with malware or virus that may transmit sensitive information to an unauthorized party.

For example, the user device may request trustworthiness attributes to verify that the POS terminal: is being operated by a known merchant; was manufactured by a trusted entity (e.g., by requesting a manufacturer identifier, or by performing challenge and response protocol to confirm certificates from a trusted manufacturer are mutually provisioned on the user device and the POS device, etc.); has all the software/firmware updates; has good integrity (e.g., as indicated by digital fingerprint or cryptographic measurement), has been certified by a trusted authority, etc. The user device may additionally assess the trustworthiness of the POS device by determining if the user has a history of conducting payment transactions with POS device or at the merchant location. If the assessment of the POS device indicates that the POS device can be trusted, the user device may then carry out the payment transaction with the POS device. If the assessment of the POS device indicates that the POS device can be trusted, the user device may cease communication with the POS device to prevent sensitive information from being transmitted to the suspect POS device.

It should be appreciated that the specific blocks illustrated in FIGS. 3 and 6-8 provide examples of processes performed according to some embodiments. Other sequences of operations may also be performed accordingly in alternative embodiments. For example, alternative embodiments of the present invention may perform the operations shown in FIGS. 3 and 6-8 in a different order. Moreover, the individual steps illustrated in FIGS. 3 and 6-8 may include multiple sub-steps that may be performed in various sequences as appropriate to the individual step. Furthermore, additional steps may be added or removed depending on the particular embodiments. One of ordinary skill in the art would recognize and appreciate many variations, modifications, and alternatives of these processes.

Figure 9:
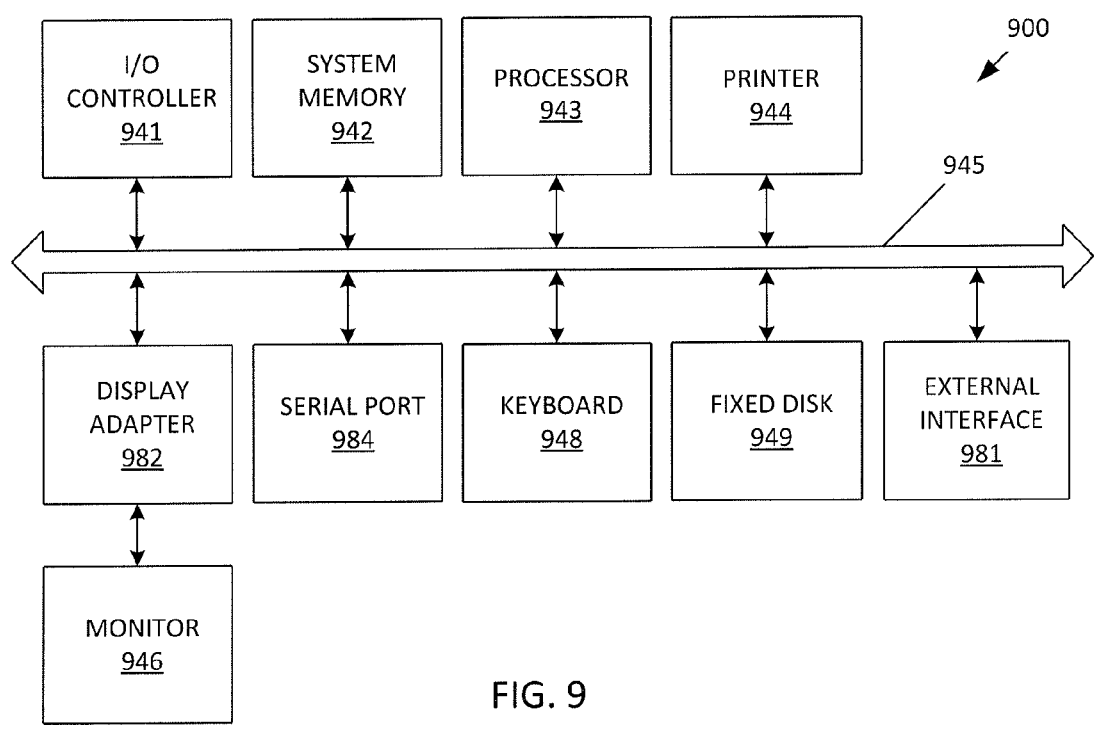
FIG. 9 illustrates a block diagram of an exemplary computing device in accordance with some embodiments of the invention.

FIG. 9 is a high level block diagram of a computer system that may be used to implement any of the entities or components or devices described herein. The subsystems shown in FIG. 9 are interconnected via a system bus 945. Additional subsystems may include a printer 944, keyboard 948, fixed disk 949, and monitor 946, which is coupled to display adapter 982. Peripherals and input/output (I/O) devices, which couple to I/O controller 941, can be connected to the computer system by any number of means known in the art, such as a serial port. For example, serial port 984 or external interface 981 can be used to connect the computer apparatus to a wide area network such as the Internet, a mouse input device, or a scanner. The interconnection via system bus 945 allows the processor 943 (e.g., single core, multicore, SoC) to communicate with each subsystem and to control the execution of instructions from system memory 942 or the fixed disk 949, as well as the exchange of information between subsystems. The system memory 942 and/or the fixed disk 949 may embody a computer accessible medium.

As described, the techniques provided herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer accessible medium, such as a random access memory (RAM), a read-only memory (ROM), a magnetic medium such as a hard-drive or a floppy disk, or an optical medium such as a CD-ROM. Any such computer accessible medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art. One or more features from any embodiment may be combined with one or more features of any other embodiment without departing from the scope of the invention.

As used herein, the use of "a", "an" or "the" is intended to mean "at least one", unless specifically indicated to the contrary.

What is claimed is:

1. A method comprising:
    requesting, by a user device, one or more trustworthiness attributes of a target device before exchanging data with the target device;
    receiving the one or more trustworthiness attributes of the target device;
    determining, based on the received one or more trustworthiness attributes of the target device, a set of one or more security policies to enforce on a communication channel used for exchanging data between the user device and the target device, wherein the set of one or more security policies is determined by determining a trustworthiness score of the target device based on the received one or more trustworthiness attributes of the target device, and determining a trust level of the target device based on the trustworthiness score; and
    establishing the communication channel between the user device and the target device according to the set of one or more security policies,
    wherein when the trust level of the target device corresponds to a first trust level, the set of one or more security policies includes at least one of using a first encryption algorithm to encrypt the data being exchanged on the communication channel, and digitally signing the data being exchanged on the communication channel, and when the trust level of the target device corresponds to a second trust level, the set of one or more security policies includes at least one of using a second encryption algorithm that is different than the first encryption algorithm to encrypt the data being exchanged on the communication channel.

2. The method of claim 1, further comprising:
    performing an authentication process between the user device and the target device before requesting the one or more trustworthiness attributes.

3. The method of claim 2, further comprising:
    after receiving the one or more trustworthiness attributes of the target device, requesting additional credentials from the target device before establishing the communication channel.

4. The method of claim 1, further comprising:
    comparing the trustworthiness score of the target device against a set of trustworthiness thresholds.

5. The method of claim 1, wherein when the user device is at a first location, the one or more trustworthiness attributes of the target device being requested by the user device before exchanging data with the target device includes at least one trustworthiness attribute that is different than when the user device is at a second location.

6. The method of claim 1, wherein the one or more trustworthiness attributes includes a plurality of trustworthiness attributes, and each of the plurality of trustworthiness attributes is requested and received serially.

7. The method of claim 1, wherein the one or more trustworthiness attributes include at least one of an ownership of the target device, an integrity measurement of the target device, or a trustworthiness reputation of the target device.

8. The method of claim 1, wherein the set of one or more security policies include at least one of an access rule, an encryption rule, or a digital signature rule for the data being exchanged on the communication channel.

9. A user device comprising:
    communication circuitry for implementing a communication channel used for exchanging data with a target device;
    one or more processors; and
    one or more memories coupled to the one or more processors and including executable code which when executed by the one or more processors causes the user device to:
        request one or more trustworthiness attributes of a target device before establishing the communication channel with the target device;
        receive the one or more trustworthiness attributes of the target device;
        determine, based on the received one or more trustworthiness attributes of the target device, a set of one or more security policies to enforce on the communication channel when exchanging data with the target device, wherein the set of one or more security policies is determined by determining a trustworthiness score of the target device based on the received one or more trustworthiness attributes of the target device, and determining a trust level of the target device based on the trustworthiness score;
        establish the communication channel using the communication circuitry after determining the set of one or more security policies; and
        enforce the set of one or more security policies on the communication channel when exchanging data with the target device,
    wherein when the trust level of the target device corresponds to a first trust level, the set of one or more security policies includes at least one of using a first encryption algorithm to encrypt the data being exchanged on the communication channel, and digitally signing the data being exchanged on the communication channel, and when the trust level of the target device corresponds to a second trust level, the set of one or more security policies includes at least one of using a second encryption algorithm that is different than the first encryption algorithm to encrypt the data being exchanged on the communication channel, and not digitally signing the data being exchanged on the communication channel.

10. The user device of claim 9, wherein the one or more memories further include executable code which when executed by the one or more processors causes the user device to:
    compare the trustworthiness score of the target device against a set of trustworthiness thresholds.

11. The user device of claim 10, wherein the one or more memories further include executable code which when executed by the one or more processors cause the user device to store the trustworthiness score of the target device in a known-device database, wherein the stored trustworthiness score is used instead of requesting the one or more trustworthiness attributes when establishing a subsequent communication channel with the target device.

12. The user device of claim 11, wherein the stored trustworthiness score is valid for a predetermined time period, and the stored trustworthiness score is not used for establishing a subsequent communication channel with the target device after the predetermined time period has elapsed.

13. The user device of claim 9, wherein when the user device is at a first location, the one or more trustworthiness attributes of the target device being requested by the user device before establishing the communication channel includes at least one trustworthiness attribute that is different than when the user device is at a second location.

14. The user device of claim 9, wherein the one or more trustworthiness attributes include at least one of an ownership of the target device, an integrity measurement of the target device, or a trustworthiness reputation of the target device.

15. The user device of claim 9, wherein the set of one or more security policies include at least one of an access rule, an encryption rule, or a digital signature rule for the data being exchanged on the communication channel.

16. A method comprising:
receiving, by a target device, a request from a user device for one or more trustworthiness attributes of the target device before exchanging data with a user device;
determining the one or trustworthiness attributes of the target device;
sending the determined one or more trustworthiness attributes of the target device to the user device;
receiving one or more security policies to enforce on a communication channel used for exchanging data between the user device and the target device, wherein the set of one or more security policies is determined by determining a trustworthiness score of the target device based on the received one or more trustworthiness attributes of the target device, and determining a trust level of the target device based on the trustworthiness score; and
establishing the communication channel between the user device and the target device according to the one or more security policies,
wherein when the trust level of the target device corresponds to a first trust level, the set of one or more security policies includes at least one of using a first encryption algorithm to encrypt the data being exchanged on the communication channel, and digitally signing the data being exchanged on the communication channel, and when the trust level of the target device corresponds to a second trust level, the set of one or more security policies includes at least one of using a second encryption algorithm that is different than the first encryption algorithm to encrypt the data being exchanged on the communication channel.

17. The method of claim 16, wherein the one or more trustworthiness attributes include at least one of an ownership of the target device, an integrity measurement of the target device, or a trustworthiness reputation of the target device.

18. The method of claim 17, wherein the set of one or more security policies include at least one of an access rule for one or more memory regions of the user device, an encryption rule for the data being exchanged on the communication channel, or a digital signature rule for the data being exchanged on the communication channel.

* * * * *